(12) United States Patent
Tsang et al.

(10) Patent No.: US 7,546,628 B2
(45) Date of Patent: Jun. 9, 2009

(54) IP ADDRESS DISCOVERY FOR CABLE MODEM IN SET-TOP BOX

(75) Inventors: Gilbert Ho Yin Tsang, San Jose, CA (US); Takahiro Fujimori, San Jose, CA (US); Eric Chen, Saratoga, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 244 days.

(21) Appl. No.: 11/439,713

(22) Filed: May 24, 2006

(65) Prior Publication Data

US 2006/0212919 A1 Sep. 21, 2006

Related U.S. Application Data

(62) Division of application No. 09/686,120, filed on Oct. 11, 2000, now Pat. No. 7,203,954.

(51) Int. Cl.
| | |
|---|---|
| H04N 7/173 | (2006.01) |
| H04N 7/16 | (2006.01) |
| G06F 15/16 | (2006.01) |
| H04B 1/38 | (2006.01) |
| H04B 3/00 | (2006.01) |
| H04L 5/16 | (2006.01) |
| H04L 25/00 | (2006.01) |

(52) U.S. Cl. ............... 725/151; 725/111; 709/245; 375/222; 375/257

(58) Field of Classification Search .......... 725/151, 725/111; 375/222, 257; 709/245
See application file for complete search history.

(56) References Cited

U.S. PATENT DOCUMENTS

| 5,287,103 | A | * | 2/1994 | Kasprzyk et al. | 340/825.52 |
| 5,588,109 | A | * | 12/1996 | Dickinson et al. | 715/740 |
| 5,675,831 | A | * | 10/1997 | Caputo | 710/10 |
| 5,910,970 | A | * | 6/1999 | Lu | 375/377 |
| 5,929,849 | A | * | 7/1999 | Kikinis | 725/113 |
| 6,005,937 | A | * | 12/1999 | Lee | 380/211 |
| 6,990,601 | B1 | * | 1/2006 | Tsuneya et al. | 714/4 |

OTHER PUBLICATIONS

All art considered in examination of parent U.S. Appl. No. 09/686,120.

* cited by examiner

*Primary Examiner*—Dominic D Saltarelli
(74) *Attorney, Agent, or Firm*—Miller Patent Services; Jerry A. Miller

(57) ABSTRACT

A Set-Top Box configured with a modem and a Main Circuit Board consistent with certain embodiments learns the modem's IP address by establishing a predetermined relationship between a hardware address of the modem and a hardware address of the Main Circuit Board; at the Main Circuit Board: ascertaining the hardware address of the modem from the predetermined relationship; sending a query from the Main Circuit Board to the hardware address of the modem requesting the modem's IP address; and receiving a reply from the modem providing the modem's IP address to the Main Circuit Board. This abstract is not to be considered limiting, since other embodiments may deviate from the features described in this abstract.

20 Claims, 2 Drawing Sheets

US 7,546,628 B2

IP ADDRESS DISCOVERY FOR CABLE MODEM IN SET-TOP BOX

CROSS REFERENCE TO RELATED DOCUMENTS

This application is a divisional application of pending U.S. patent application Ser. No. 09/686,120 filed Oct. 11, 2000, now U.S. Pat. No. 7,203,954 which is hereby incorporated by reference.

FIELD OF THE INVENTION

This invention relates generally to the field of Set-Top Boxes. More particularly, the present invention is related to a Set-Top Box having distinct Cable Modem (CM) or other managed component and Main Circuit Board (controller) components and a mechanism for providing the Main Circuit Board with the ability to know the IP address of the Cable Modem.

BACKGROUND OF THE INVENTION

Set-Top Boxes used for cable television and satellite communications are proliferating and becoming a powerful hub for home entertainment. Such Set-Top Boxes, particularly digital Set-Top Boxes, not only facilitate the tuning of television programming but also are destined to provide pay per view, interactive television and Internet access to subscribers. Digital Set-Top Boxes are basically powerful computers with high-speed communications ability. However, such Set-Top Boxes, in order to become widely accepted and utilized, should be manufacturable at low cost and be easily repaired. In certain environments, it is advantageous to manufacture a Set-Top Box using multiple modular components which interact with one another. For example, a main computer circuit board can readily be manufactured as one assembly while a display mechanism and a Cable Modem can be manufactured as two other circuit boards, modules or sub-assemblies. This permits easy upgrade of the Cable Modem or the Main Circuit Board (Main Board) to add enhanced features at reasonable cost. Moreover, this facilitates the ability to utilize Cable Modems, Digital Subscriber Line (DSL) modems or satellite modems or other communication mechanisms in conjunction with a single standard Main Circuit Board.

In general, Cable Modems and other such communication devices communicate over the cable or other media via IP (Internet Protocol.) Thus, an Internet Protocol (IP) address is assigned to the Cable Modem by the network administrator to facilitate network management and administrative functions. This may present difficulty, however, in providing a multiple circuit board modular approach to a Set-Top Box design in that the Main Board often needs to carry out actions requiring the IP address but may not have easy access to it since it is basically assigned to the Cable Modem. Thus, a mechanism is needed to communicate the IP address from the Cable Modem to the Main Circuit Board. It is also desirable to share a single display controlled by the Main Circuit Board to display not only information related generally to the operation of the Set-Top Box, but specifically to the Cable Modem. In each such case, the Main Circuit Board may require an IP address for the Cable Modem in order to utilize the common display.

While it is possible to hard wire memory locations or provide elaborate circuitry to provide the Main Circuit Board with the IP address residing in the Cable Modem, the interconnections required to accomplish this would increase the cost of the Set-Top Box, increase the wiring complexity and decrease reliability. It is therefore desirable to use conventional interconnection techniques such as Ethernet protocol or other protocol requiring minimal interconnection to couple the modules within the Set-Top Box together. Under these constraints, there remains the problem of how to communicate an IP address which may be assigned and reassigned by a network administrator from the Cable Modem to the Main Circuit Board.

OVERVIEW OF SELECTED EMBODIMENTS OF THE INVENTION

The present invention relates generally to Set-Top Boxes. Objects, advantages and features of the invention will become apparent to those skilled in the art upon consideration of the following detailed description of the invention.

A Set-Top Box, according to certain embodiments, is configured with a modem and a Main Circuit Board. The Main Circuit Board determines an IP address of the modem by periodically broadcasting a Discovery Packet from the modem to a broadcast address, the Discovery Packet having at least the IP address of the modem. At the Main Circuit Board, the broadcast Discovery Packet is received from the modem. The IP address of the modem is ascertained from the broadcast Discovery Packet.

In one embodiment of the present invention a Set-Top Box is configured with a modem and a Main Circuit Board. A method of enabling the Main Circuit Board to determine the IP address of the modem, includes at the modem: periodically broadcasting a Discovery Packet from the modem to a broadcast address, the Discovery Packet having at least the IP address of the modem; and at the Main Circuit Board: receiving the broadcast Discovery Packet from the modem; and ascertaining the IP address of the modem from the broadcast Discovery Packet.

A Set-Top Box consistent with embodiments of the present invention includes a modem. A Main Circuit Board is interconnected to the modem via an interconnection. The modem includes a mechanism, residing within the modem, for periodically transmitting a Discovery Packet from the modem to the Main Circuit Board. The Discovery Packet has at least an IP address of the modem.

A Set-Top Box consistent with certain embodiments of the invention, includes a modem. A Main Circuit Board is interconnected to the modem via any suitable interconnection. A programmed processor, residing within the modem, transmits a Discovery Packet from the modem to the Main Circuit Board at intervals of approximately 30 seconds, or any other time interval desired depending upon how frequently it is desired to have the Main Circuit Board learn the IP address of the modem. The Discovery Packet preferably has an IP address of the modem, and a suitable authentication code such as a ten character ascii authentication code, digital signature, encryption key, etc. The Main Circuit Board, upon receiving the Discovery Packet, inspects the authentication code to assure that the IP address in the Discovery Packet originated at the modem. The Discovery Packet further includes a multiple byte (e.g. four byte) integer status code indicative of a running status of the modem. A display is preferably coupled to the Main Circuit Board and can display a status of the modem.

In a Set-Top Box configured with a modem and a Main Circuit Board according to embodiments of the present invention, a method of enabling the Main Circuit Board to determine the IP address of the modem, includes: establishing a predetermined relationship between a hardware address of the modem and a hardware address of the circuit board; at the Main Circuit Board: ascertaining the hardware address of the modem from the predetermined relationship; sending a query (e.g. a RARP-Release Address Resolution Protocol query) from the Main Circuit Board to the hardware address of the modem requesting the modem's IP address; and receiving a reply from the modem providing the modem's IP address to the Main Circuit Board.

In a Set-Top Box configured with a modem and a Main Circuit Board according to another embodiment of the invention, a method of enabling the Main Circuit Board to determine the IP address of the modem, includes: establishing a predetermined relationship between a hardware address of the modem and a hardware address of the circuit board; at the Main Circuit Board: ascertaining the hardware address of the modem from the predetermined relationship; at the modem: receiving a query from the Main Circuit Board to the hardware address of the modem requesting the modem's IP address; and sending a reply from the modem providing the modem's IP address to the Main Circuit Board.

A Set-Top Box consistent with certain embodiments of the invention includes a modem. A Main Circuit Board is interconnected to the modem via an interconnection. The Main Circuit Board and the modem have hardware addresses which are related using a predetermined relationship. A processor, residing within the Main Circuit Board, determines the modem's hardware address from the Main Circuit Board's address and the predetermined relationship. The processor transmits a request from the Main Circuit Board to the modem over the interconnection using the hardware address of the modem, the request including a request for the modem's current IP address. The processor receives a reply from the modem containing the modem's current IP address.

A Set-Top Box consistent with other embodiments of the invention includes first and second managed components. A Main Circuit Board is interconnected to the first and second managed components via any suitable interconnection. Each of the first and second managed components periodically transmits a Discovery Packet to the Main Circuit Board. The Discovery Packet has at least an IP address of the managed component from which it was transmitted, and preferably a signature that is used by the Main Circuit Board to distinguish between the first and second managed components.

A Set-Top Box according to yet another embodiment of the invention includes a managed component. A Main Circuit Board is interconnected to the managed component via any suitable interconnection. The managed component periodically transmits a Discovery Packet to said Main Circuit Board. The Discovery Packet includes at least an IP address of the managed component.

In Set-Top Box configured with first and second managed components and a control circuit, a method consistent with certain embodiments of the invention enables the control circuit to determine the IP address of the first and second managed components by: establishing a predetermined relationship between a hardware address of the first and second managed components and a hardware address of the control circuit; at the Main Circuit Board: ascertaining the hardware address of the first managed component from the predetermined relationship; ascertaining the hardware address of the second managed component from the predetermined relationship; sending a query from the Main Circuit Board to the hardware address of the first managed component requesting the first managed component's IP address; receiving a reply from the first managed component providing the first managed component's IP address to the Main Circuit Board; sending a query from the Main Circuit Board to the hardware address of the second managed component requesting the second managed component's IP address; and receiving a reply from the second managed component providing the second managed component's IP address to the Main Circuit Board.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
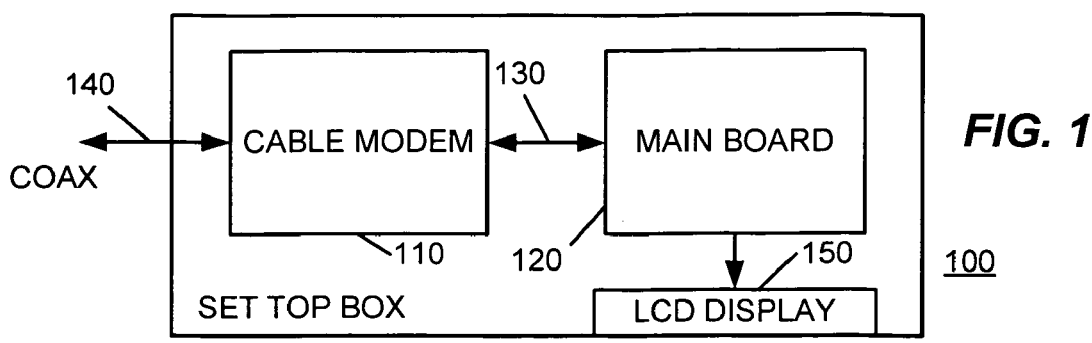
FIG. 1, a block diagram of a Cable Modem using a modular circuit configuration.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a cable Set-Top Box 100 is illustrated using a modular construction in accordance with the present invention. In this embodiment, a controlled device (or multiple controlled devices) such as Cable Modem 110 is coupled to a controlling device such as a Main Circuit Board 120 via an interconnection 130. The interconnection 130 is preferably a standard interconnection such as Ethernet, USB (Universal Serial Bus), PCI bus, etc. The Cable Modem 110 is linked via a coaxial cable 140 to an upstream service provider that manages the IP address of Cable Modem 110. In addition, an LCD display, or other type of display, 150 may be provided in the Set-Top Box to provide status information and other information useful to the subscriber.

By using standard Ethernet connections and the like for interconnection 130, standard components can be utilized with minimal interconnection lines coupling the Cable Modem 110 to the Main Board 120. By way of example, integrated Ethernet circuits can be utilized within the Cable Modem 110 and Main Board 120 to facilitate communication at minimal cost. Custom or semi-custom integrated circuits can be utilized along with programmed processors to implement the Cable Modem 110 and the Main Board 120.

While FIG. 1 illustrates a Set-Top Box 100 utilizing a Cable Modem 110, those skilled in the art will recognize that the invention is not so limited since a DSL modem, satellite modem or other controlled device interconnected with a controller such as Main Circuit Board 120 via an interconnection mechanism 130 can equally well utilize the present invention without limitation.

As previously stated, the Cable Modem 110 receives a dynamically allocated IP address from a network administrator in order to carry out network administration functions. Thus, the IP address is subject to change and is not a hard address that can be coded into the Cable Modem logic. However, Main Board 120 may require access to the Cable Modem's IP address in order to carry out various functions over the network. Due to the dynamic assignment of IP addresses to Cable Modem 110, the Main Board 120 should be able to obtain the most recently assigned IP address in order to assure correct functionality. In certain embodiments of the invention, both Cable Modem 110 and Main Board 120 include programmed processors for carrying out the processes to be described hereinafter.

Figure 2:
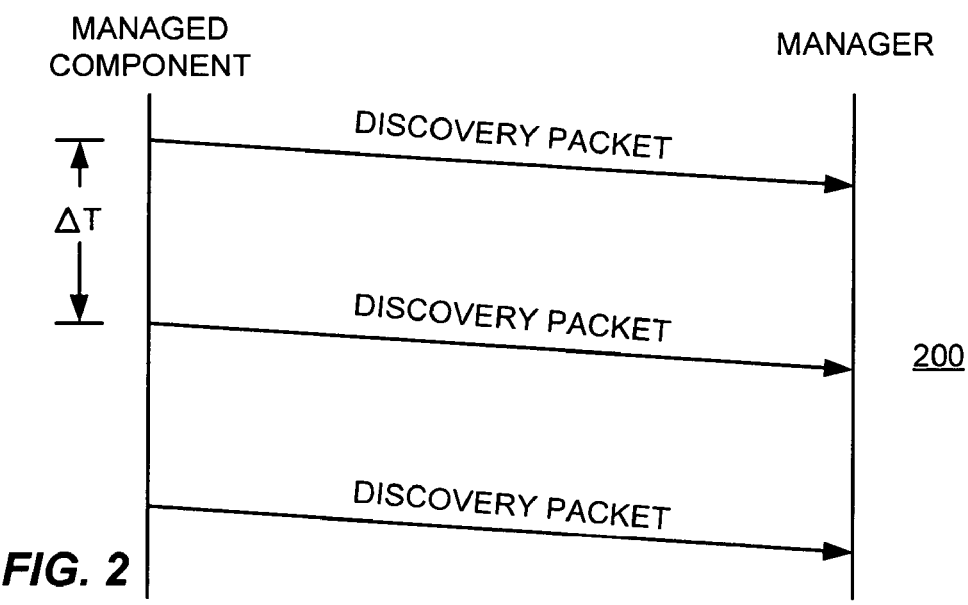
FIG. 2, is a message flow diagram for a first embodiment consistent with the present invention.

With reference to FIG. 2, one embodiment of the present invention provides for the Cable Modem 110 (or other controlled device or network device) to broadcast to Main Circuit Board 120 (or other controller), via interconnection 130, a Discovery Packet on a periodic basis as illustrated in the message flow diagram 200. This Discovery Packet is preferably communicated using the well known User Datagram Protocol (UDP) for supplying short messages with low overhead. Thus, on a periodic basis with period δT, a Discovery Packet is transmitted from the managed component (in this case Cable Modem 110) to the Manager Component (in this case the Main Circuit Board 120).

Figure 3:
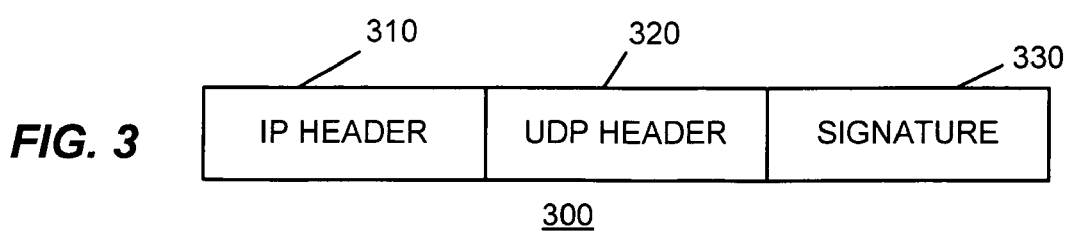
FIG. 3, is a first embodiment of a Discovery Packet in accordance with embodiments of the present invention.

FIG. 3 describes the Protocol Data Unit (PDU) of one embodiment of the Discovery Packet 300 used in conjunction with the present invention. In this embodiment, a Discovery Packet 300 is made up of an IP header 310, a UDP header 320 and a signature 330. In this case the signature is a defined signature (e.g. a multiple character ascii character string that might be encrypted) that tells the Main Circuit Board 120 that the Discovery Packet is being sent directly by the Cable Modem 110 or other managed component. In time period δT may be any suitable convenient time period such as, for example, 30 seconds. Once this Discovery Packet is transmitted from the Cable Modem 110 to the Main Board 120, the Main Board 120 can ascertain the IP address from the IP header 310. Main Board 120 can then utilize the IP address as required to carry out any operations. The managing device (Main Board 120) should preferably only accept packets with the proper signature from the managed device (Cable Modem 110) for authentication purposes, but this should not be considered limiting since alternative embodiments may not require the signature 330. Yet other arrangements can use encryption such as public key encryption to enhance the security of the signature. Other protocols and data arrangements can be used for the Discovery Packet.

Figure 4:
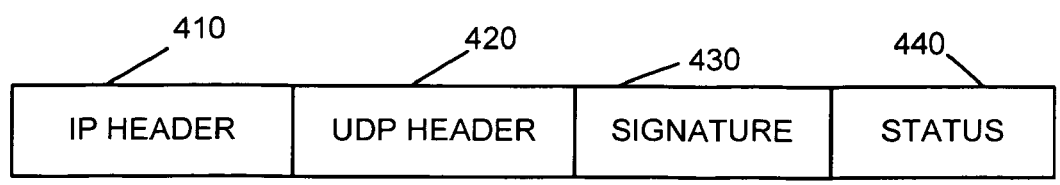
FIG. 4, is a second embodiment of a Discovery Packet in accordance with certain embodiments of the present invention.

Referring now to FIG. 4, an alternative embodiment of a Protocol Data Unit used for Discovery Packet 400 is shown. In this embodiment, the Discovery Packet 400 includes an IP header 410, a UDP header 420, a signature 430 and a status indicator 440. In certain embodiments, the signature and/or the status code can be encrypted (e.g. using public key encryption) for higher levels of security. IP headers 310 and 410 may be essentially identical or similar as well as UDP header 420 and 320. Signature 330 and 430 may also be identical or similar. The status indicator 440 provides a status indication of the Cable Modem 110 status each time a Discovery Packet is transmitted to the Main Board 120. In this embodiment, the Main Board 120 may thus always be apprized of the status of the Cable Modem 110 and can, if desired, display such status using the LCD display 150 without need to make further inquiries of Cable Modem 110. This provides the STB 100 with a cost effective mechanism to display status information, including status of the modem, without need for a separate modem status indicator.

In the case of the Cable Modem 110, the following TABLE 1 describes the type of information contained in the IP header, the UDP header, the signature and the status designator if used for certain preferred embodiments of the invention wherein the controlled device is a modem. Other protocols and data arrangements can be used for the Discovery Packet.

TABLE 1

| PACKET COMPONENT | CONTENT | VALUE |
|---|---|---|
| IP header | source address | IP address of CM |
|  | destination address | broadcast address |
| UDP header | source UDP port | don't care |
|  | destination UDP port | pre-assigned port number (e.g. 8000) |
| Signature | 10 character ascii string | e.g. SONY-STBCM (in hex = 534F4E592D535442434D) |
| Status = 4 byte integer representing running status of managed component | HEX VALUE (for Cable Modem) | MEANING |
|  | 0 | No QAM DS Signal is presented or Channel acquisition |
|  | 1 | QAM lock OK |
|  | 11 | FEC lock OK, Found DS channel |
|  | 21 | Ranging response received OK, Found US |
|  | 31 | DHCP response received OK |
|  | 41 | TOD (Time of Day) response OK |
|  | 51 | TFTP (Trivial FTP) transfer OK |
|  | 61 | CMTS registration OK, Modem online, operational and ready to transfer data |
| byte next to least significant byte | 100 | Ethernet link established |
|  | 200 | USB device is presented |

Each value of the four byte status word represents a running status of the Cable Modem 110. Other status word can be devised for other controlled devices and other network devices consistent with the present invention. Other values not appearing in TABLE 1 are reserved for future use.

The least significant byte indicates the cable modem status. The byte next to the least significant byte indicates the status of the communication link. The remaining two bytes are reserved. Together, the two least significant bytes indicate the running status of the Cable Modem 110. By way of example, hex 361 would mean that the Cable Modem 110 is online and both Ethernet and USB are working. Similarly, hex 161 would mean the cable modem is online and Ethernet is working but no USB. As a final example, 21 hex means the cable modem has received the ranging response and is waiting for DHCP response, and no Ethernet or USB link has yet been established. In certain embodiments, the status as well as the signature discussed above can be encrypted for higher levels of security. Public key encryption or other forms of encryption can be used.

The methods described above provide simple mechanisms for the Main Board 120 to always be apprized of the IP address (and possibly status) of the Cable Modem 110. It should be noted that the information provided in TABLE 1 is applicable only to a Cable Modem 110. Codes for a DSL modem, a satellite modem or other modem, network device or controlled device may differ.

Figure 5:
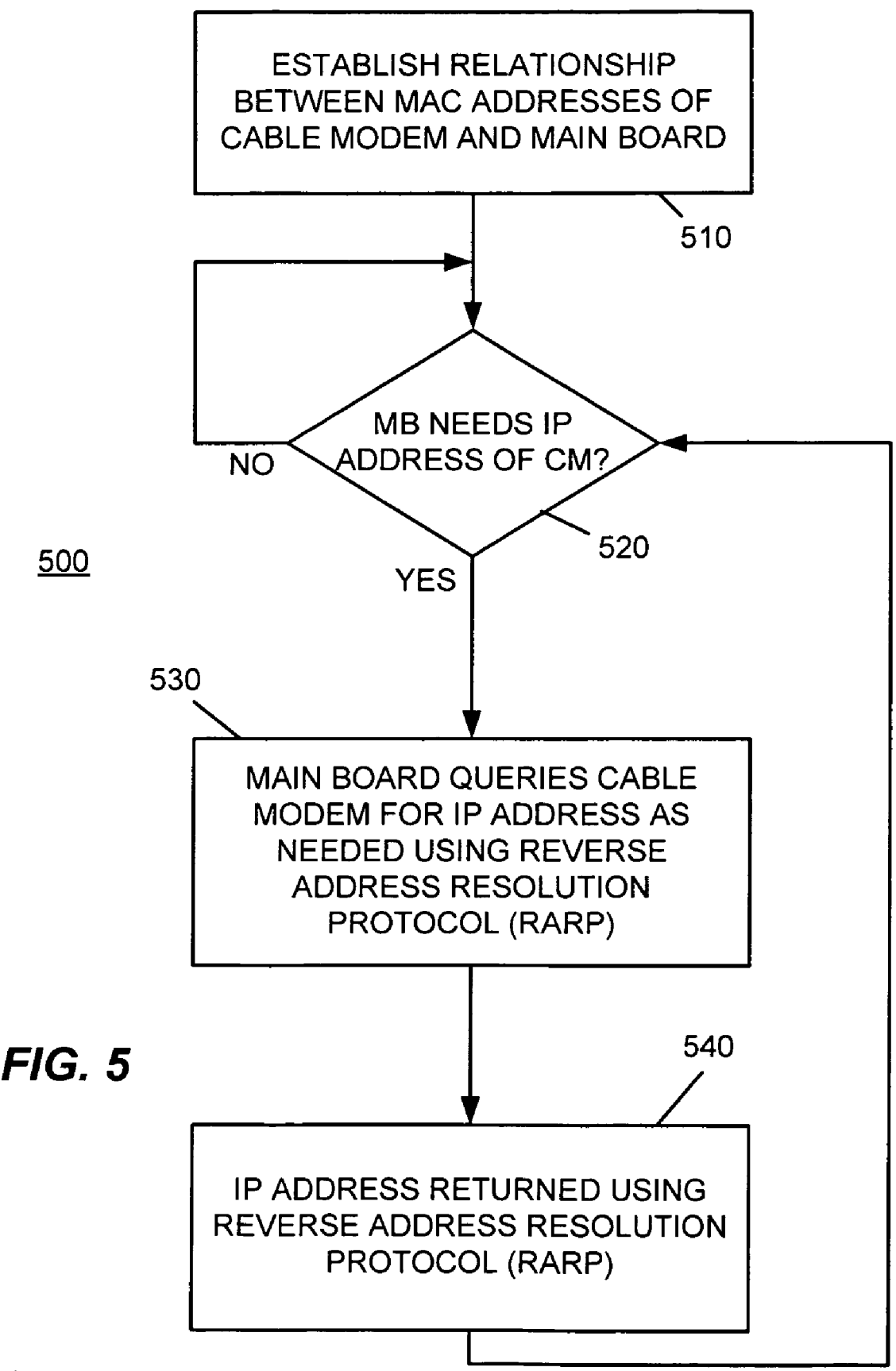
FIG. 5, is a flow chart illustrating an alternative embodiment of the present invention utilizing Reverse Address Resolution Protocol.

In an alternative embodiment, Reverse Address Resolution Protocol can be utilized to determine the IP address of the Cable Modem 110. A process for determining the IP address using this mechanism is illustrated as Process 500 of FIG. 5. In this process, at the time of manufacture, programming or configuration, a MAC address is established for both the Cable Modem 110 (or other controlled device/network device) and the Main Board 120 (controller). For example, the MAC address for the Cable Modem 110 and Main Board 120 may be numerically adjacent hardware addresses at 510. Thus, for example, the Cable Modem 110 address may be equal to the Main Board 120 address +1. In this manner, the hardware MAC address of the Cable Modem 110 can be readily ascertained by the Main Circuit Board 120 at 510. Of course, other relationships can be used.

Whenever the Main Board 120 needs an IP address of the Cable Modem 110 at 520, the Main Board 120 simply queries the Cable Modem 110 port side the address as needed using Reverse Address Resolution Protocol (RARP) at 530. The IP address is then returned at 540 using Reverse Address Resolution Protocol so that the Main Board 120 knows the IP address of the Cable Modem 110. The process then awaits the next incident of the Main Board 120 needing the IP address of the Cable Modem 110 at 520. This process can be considered proactive with the Main Board 120 querying to obtain the Cable Modem's IP address as needed in contrast to the reactive embodiment described earlier, where the Main Board 120 simply waits for the next broadcast from the Cable Modem 110 of a Discovery Packet.

By virtue of requiring a strict relationship between the MAC addresses of the Cable Modem 110 and the Main Board 120, process 500 may be highly advantageous in single circuit board Set-Top Boxes. However, should the Main Board 120 or Cable Modem 110 require replacement, an extra complication is involved for the establishment of the relationship between the Cable Modem 110 and the Main Board 120. However, this could be accomplished by reprogramming of an Electrically Erasable Programmable Read Only Memory (EEPROM) within either Cable Modem 110, Main Circuit Board 120 or both to establish the related MAC addresses.

Although the present invention has been described in terms of a Main Circuit Board and a Cable modem, those skilled in the art will appreciate that the present invention is equally applicable to a scenario wherein multiple modems are available to the Main Circuit Board. In this case, each modem has a unique signature and hardware MAC address that can be used in each of the above embodiments to distinguish between the multiple modems. Moreover, while the invention has been directed toward finding the address of a modem, it can be equivalently used to find the address of any network device.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and message flow diagram form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. In Set-Top Box configured with a modem and a Main Circuit Board, a method of enabling the Main Circuit Board to determine the IP address of the modem, comprising:
   establishing a predetermined relationship between a hardware address of the modem and a hardware address of the Main Circuit Board, wherein the hardware address of the modem is a fixed address assigned to the modem and wherein the hardware address of the Main Circuit Board is a fixed address assigned to the Main Circuit Board such that the hardware address of the modem is a function of the hardware address of the Main Circuit Board;
   the modem and the Main Circuit Board being situated within the Set-Top Box;
   at the Main Circuit Board:
      calculating the hardware address of the modem from the Main Circuit Board's hardware address by applying the predetermined relationship to the Main Circuit Board's hardware address;
      sending a query from the Main Circuit Board to the hardware address of the modem requesting the modem's IP address; and
      receiving a reply from the modem providing the modem's IP address to the Main Circuit Board.

2. The method according to claim 1, wherein the query and reply are carried out using Reverse Address Resolution Protocol.

3. The method according to claim 1, wherein the modem comprises a Cable Modem.

4. The method according to claim 1, wherein the modem comprises a DSL modem.

5. The method according to claim 1, wherein the modem comprises a satellite modem.

6. The method according to claim 1, further comprising:
   establishing a predetermined relationship between a hardware address of a network device and a hardware address of the Main Circuit Board, wherein the hardware address of the modem is a fixed address assigned to with the modem and wherein the hardware address of the Main Circuit Board is a fixed address assigned with the Main Circuit Board such that the hardware address of the modem is a function of the hardware address of the Main Circuit Board;

at the Main Circuit Board:
calculating the hardware address of the network device from the Main Circuit Board's address by applying the predetermined relationship to the Main Circuit Board's hardware address;
sending a query from the Main Circuit Board to the hardware address of the network device requesting the network device's IP address; and
receiving a reply from the network device providing the network device's IP address to the Main Circuit Board.

7. In a Set-Top Box configured with first and second managed components and a control circuit, a method of enabling the control circuit to determine the IP address of the first and second managed components, comprising:
establishing a predetermined relationship between a hardware address of the first and second managed components and a hardware address of the control circuit, wherein the hardware address of the first and second managed componets are fixed addresses assigned to the first and second managed components respectively, and wherein the hardware address of the control circuit is a fixed address assigned to the control circuit such that the hardware address of the first and second managed components are a function of the hardware address of the control circuit;
the first and second managed components and the control circuit being situated within the Set-Top Box;
at the control circuit:
calculating the hardware address of the first managed component from the control circuit's address by applying the predetermined relationship to the control circuit's hardware address;
calculating the hardware address of the second managed component from the control circuit's address by applying the predetermined relationship to the control cuircuit'hardware address;
sending a query from the control circuit to the hardware address of the first managed component requesting the first managed component's IP address;
receiving a reply from the first managed component providing the first managed component's IP address to the control circuit;
sending a query from the control circuit to the hardware address of the second managed component requesting the second managed component's IP address; and
receiving a reply from the second managed component providing the second managed component's IP address to the control circuit.

8. In a Set-Top Box configured with a modem and a Main Circuit Board, a method of enabling the Main Circuit Board to determine the IP address of the modem, comprising:
establishing a predetermined relationship between a hardware address of the modem and a hardware address of the Main Circuit Board; wherein the hardware address of the modem is a fixed address assigned to the modem and wherein the hardware address of the Main Circuit Board is a fixed address assigned to the Main Circuit Board such that the hardware address of the modem is a function of the hardware address of the Main Circuit Board;
the modem and the Main Circuit Board being situated within the Set-Top Box;
at the Main Circuit Board:
calculating the hardware address of the modem from the Main Circuit Board by applying the predetermined relationship to the main Circuit Board's hardware address;
at the modem:
receiving a query from the Main Circuit Board to the hardware address of the modem requesting the modem's IP address; and
sending a reply from the modem providing the modem's IP address to the Main Circuit Board.

9. The method according to claim 8, wherein the query and reply are carried out using Reverse Address Resolution Protocol.

10. The method according to claim 8, wherein the modem comprises a Cable Modem.

11. The method according to claim 8, wherein the modem comprises a DSL modem.

12. The method according to claim 8, wherein the modem comprises a satellite modem.

13. A Set-Top Box, comprising
a modem;
a Main Circuit Board interconnected to the modem via an interconnection, the Main Circuit Board and the modem having hardware addresses which are related using a predetermined relationship; wherein the hardware address of the modem is a fixed address assigned to the modem and wherein the hardware address of the Main Circuit Board is a fixed address assigned to the Main Circuit Board such that the hardware address of the modem is a function of the hardware address of the Main Circuit Board;
the Main Circuit Board and the modem being situated within the Set-Top Box;
means, residing within said Main Circuit Board, for calculating the modem's hardware address from the Main Circuit Board's address by applying the predetermined relationship to the Main Circuit Board's hardware address;
means, residing within said Main Circuit Board, for transmitting a request from the Main Circuit Board to said modem over the interconnection using the hardware address of the modem, the request comprising a request for the modem's current IP address; and
means, residing within said Main Circuit Board, for receiving a reply from the modem containing the modem's current IP address.

14. The method according to claim 13, wherein the query and reply are carried out using Reverse Address Resolution Protocol.

15. The apparatus according to claim 13, wherein the modem comprises a Cable Modem.

16. The apparatus according to claim 13, wherein the modem comprises a DSL modem.

17. The apparatus according to claim 13, wherein the modem comprises a satellite modem.

18. The apparatus according to claim 13, further comprising a display, coupled to the Main Circuit Board, displaying the status of the modem.

19. The apparatus according to claim 13, wherein the modem includes a programmed processor.

20. The apparatus according to claim 13, wherein the Main Circuit Board includes a programmed processor.

* * * * *

UNITED STATES PATENT AND TRADEMARK OFFICE
CERTIFICATE OF CORRECTION

PATENT NO. : 7,546,628 B2
APPLICATION NO. : 11/439713
DATED : June 9, 2009
INVENTOR(S) : Tsang et al.

Page 1 of 1

It is certified that error appears in the above-identified patent and that said Letters Patent is hereby corrected as shown below:

In column 5, line 30, delete "$\delta T$" and insert -- $\Delta T$ -- therefor.

In column 5, line 42, delete "$\delta T$" and insert -- $\Delta T$ -- therefor.

Claims:

In Claim 7, column 9, line 42, delete "cuircuit" and insert -- circuit -- therefor.

Signed and Sealed this

Fifteenth Day of September, 2009

David J. Kappos
*Director of the United States Patent and Trademark Office*